United States Patent
Carter et al.

(10) Patent No.: US 10,655,977 B2
(45) Date of Patent: May 19, 2020

(54) NAVIGATION SYSTEM WITH A RESTRICTED MOBILITY AND METHOD OF OPERATION THEREOF

(71) Applicant: Telenav, Inc., Santa Clara, CA (US)

(72) Inventors: Casey Carter, Sunnyvale, CA (US); Shalu Grover, Sunnyvale, CA (US); Gregory Stewart Aist, Santa Clara, CA (US)

(73) Assignee: Telenav, Inc., Santa Clara, CA (US)

( * ) Notice: Subject to any disclaimer, the term of this patent is extended or adjusted under 35 U.S.C. 154(b) by 252 days.

(21) Appl. No.: 15/842,626

(22) Filed: Dec. 14, 2017

(65) Prior Publication Data
US 2019/0186935 A1   Jun. 20, 2019

(51) Int. Cl.
   *G01C 21/34*   (2006.01)
(52) U.S. Cl.
   CPC ..... *G01C 21/3484* (2013.01); *G01C 21/3476* (2013.01)
(58) Field of Classification Search
   CPC .......................... G01C 21/3484; G01C 21/3476
   See application file for complete search history.

(56) References Cited

U.S. PATENT DOCUMENTS

| 9,547,985 B2 | 1/2017 | Tuukkanen |
| 2016/0125735 A1 | 5/2016 | Tuukkanen |
| 2017/0046637 A1* | 2/2017 | Jaygarl ................ G06Q 10/025 |

FOREIGN PATENT DOCUMENTS

| WO | 2015099679 A1 | 7/2015 |
| WO | 2015112752 A1 | 7/2015 |
| WO | 2016071012 A1 | 5/2016 |

* cited by examiner

*Primary Examiner* — Michael D Lang
(74) *Attorney, Agent, or Firm* — Perspectives Law Group, Corp.

(57) ABSTRACT

A method of operation of a navigation system comprising: determining a geographic limitation with a control unit based on the geographic limitation associated with a traveler information included in a traveler restriction information; generating a provisional route based on a path between a start point and a destination point; determining a provisional POI based on a POI of the provisional route; determining a POI restriction based on the POI restriction associated with the provisional POI included in a rule information; determining a navigation restriction based on matching the geographic limitation and the POI restriction for presenting on a device.

17 Claims, 7 Drawing Sheets

NAVIGATION SYSTEM WITH A RESTRICTED MOBILITY AND METHOD OF OPERATION THEREOF

TECHNICAL FIELD

The present invention relates generally to a navigation system, and more particularly to a system with a restricted mobility mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system without a restricted mobility mechanism to effectively control access has become a paramount concern for the consumer. The inability to control movement effectively decreases the benefit of using the tools.

Thus, a need still remains for a navigation system with a restricted mobility mechanism to control the movement effectively for the user. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: determining a geographic limitation with a control unit based on the geographic limitation associated with a traveler information included in a traveler restriction information; generating a provisional route based on a path between a start point and a destination point; determining a provisional POI based on a POI of the provisional route; determining a POI restriction based on the POI restriction associated with the provisional POI included in a rule information (410); determining a navigation restriction based on matching the geographic limitation and the POI restriction for presenting on a device.

The present invention provides a navigation system, including: a control unit for; determining a geographic limitation based on the geographic limitation associated with a traveler information included in a traveler restriction information, generating a provisional route based on a path between a start point and a destination point, determining a provisional POI based on a POI of the provisional route, determining a POI restriction based on the POI restriction associated with the provisional POI included in a rule information, determining a navigation restriction based on matching the geographic limitation and the POI restriction, and a communication interface, coupled to the control unit, for communicating the navigation restriction for presenting on a device.

The present invention provides a navigation system including a non-transitory computer readable medium including instructions for execution, the instructions comprising: determining a geographic limitation based on the geographic limitation associated with a traveler information included in a traveler restriction information; generating a provisional route based on a path between a start point and a destination point; determining a provisional POI based on a POI of the provisional route; determining a POI restriction based the POI restriction associated with the provisional POI included in a rule information; determining a navigation restriction based on matching the geographic limitation and the POI restriction for presenting on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
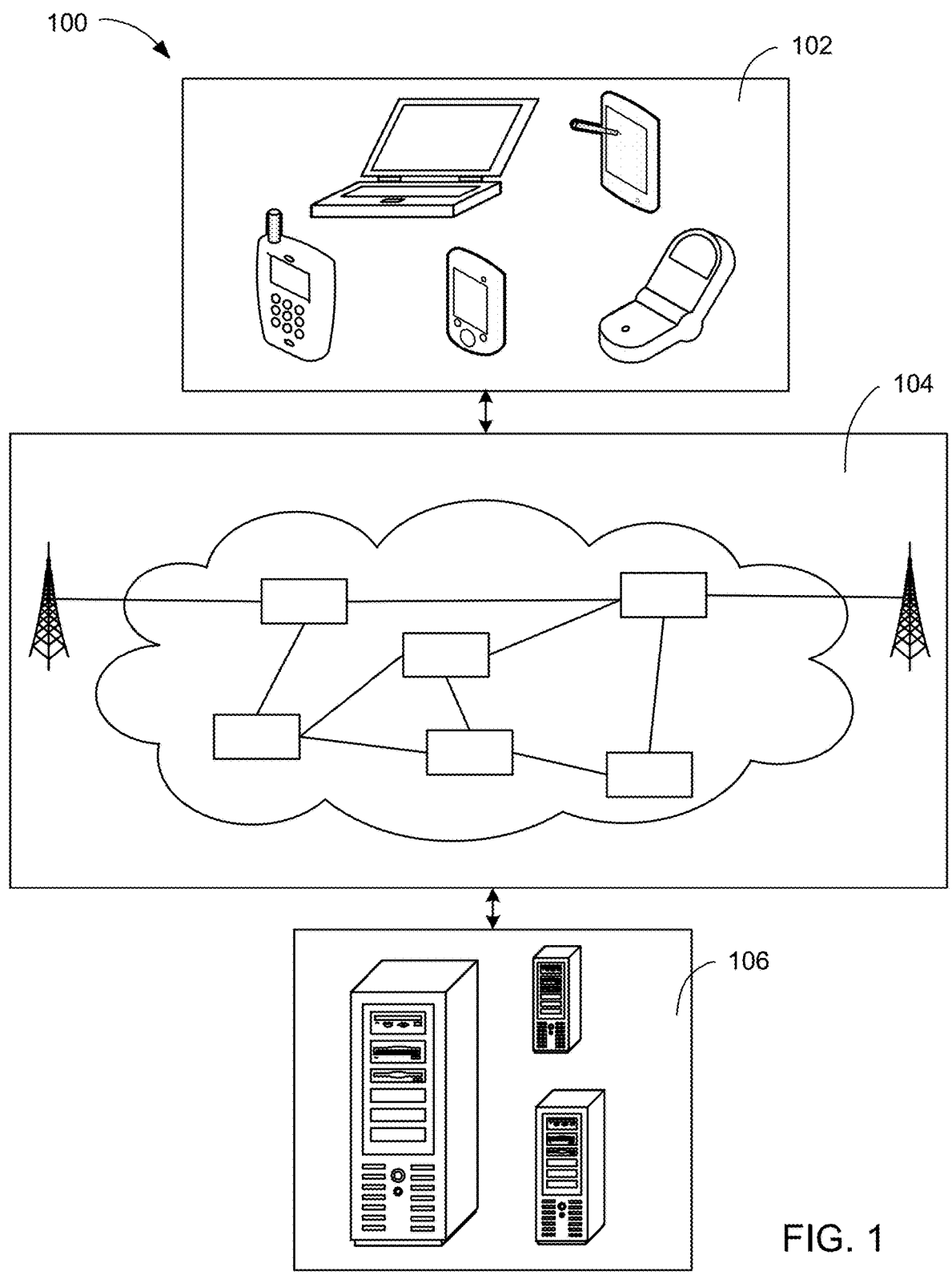
FIG. 1 is a navigation system with a communication mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

Referring now to FIG. 1, therein is shown a navigation system 100 with a restricted mobility mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the first device 102 or the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
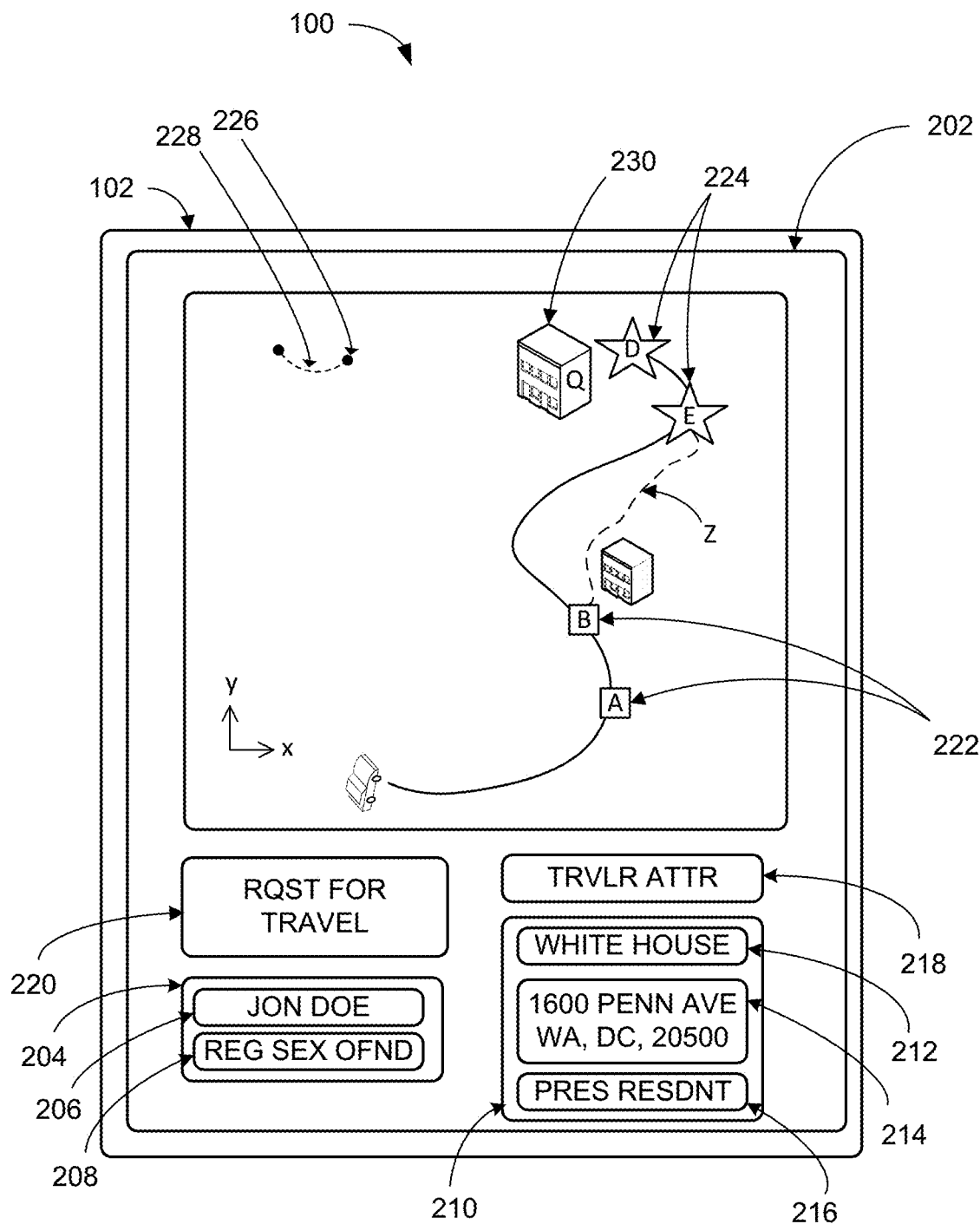
FIG. 2 is an example of a request information of the navigation system.

Referring now to FIG. 2, therein is shown an example of a request information 202 of the navigation system 100. For clarity and brevity, the various embodiments will be described with the first device 102 delivering the result generated by the navigation system 100. However, the first device 102 and the second device 106 of FIG. 1 can be discussed interchangeably.

The request information 202 is defined as an information presented for inquiring a transportation. For example, the request information 202 can include a traveler information 204, a destination information 210, or a combination thereof. The traveler information 204 is defined as detail indicating the traveler. The traveler information 204 can include a traveler identification 206, a traveler attribute 208, or a combination thereof.

The traveler identification 206 is defined as a designation identifying the traveler. For example, the traveler identification 206 can designate the identification of a traveler based on a traveler name, a traveler account number, a phone number, or a combination thereof.

The traveler attribute 208 is defined as a classification of the traveler. The traveler attribute 208 can represent the classification of the traveler in various ways. For example, the traveler attribute 208 can represent the classification of the traveler based on a traveler age, a traveler condition, a legal status, or a combination thereof.

The destination information 210 is defined as an identifying information of a location intended for travel. For example, the destination information 210 can include a destination name 212, a destination address 214, a destination description 216, or a combination thereof.

The destination name 212 is defined as a designation used for identifying the location intended for travel. For example, the destination name 212 can be represented as a registered business name of a POI (point of interest) 230. In a different example, the destination name 212 can be represented as a name of a person. The destination address 214 is defined as a place where a person, structure, an object, or a combination thereof intended for travel is located. For example, the destination address 214 can include a mailing address, a coordinate system including a Cartesian coordinate system, or a combination thereof. The destination description 216 is defined as narrative describing the location intended for travel. For example, "nearest place with a public restroom" can represent the destination description 216 identifying the POI located nearest to the traveler with a public restroom.

The POI 230 is defined as a feature that occupies a geographic area or a point. For example, the POI 230 can be referred to as businesses, government entity, parks, or a combination thereof occupying the geographic area or the point. For a specific example, the POI 230 can also be referred to as business such as a gas station, a hotel, a petrol station, or a combination thereof.

A physical location 226 is defined as a positional information. The physical location 210 can represent the geographical position of an object, a building, a person, or a combination thereof in the real world. For example, the physical location 226 can be represented by a geographic latitude and longitude based on a Cartesian coordinate system. In a different example, the physical location 226 can be represented by a mailing address.

The request information 202 can also include an information priority 218. The information priority 218 is defined as an order specifying the importance of the traveler information 204. The information priority 218 can be represented in various ways. For example, the information priority 218 can be represented in an ordinal prioritization, bucket priority queue, alphanumeric value, or a combination thereof. In this example, either the higher value such as "High" or "10", or a lower value such as "Low" or "1" can represent the greater importance based on the user preference.

The transportation request 220 is defined as an inquiry for transportation. For example, the transportation request 220 can include the inquiry for providing transportation from one instance of the physical location 226 to another. The transportation request 220 is not limited to including the inquiry for providing the transportation of a person. For example, the transportation request 220 can also include the inquiry for transporting an object, an animal, or a combination thereof. In this example, object can include various objects including a toxic chemical, an explosive, plant, fungus, bacteria, viruses, or a combination thereof. Continuing in this example, the animal can also include various animals including a dog, a cat, a livestock, or a combination thereof.

The request information 202 can also include a start point 222, a destination point 224, or a combination thereof. The start point 222 is defined as a beginning location of transportation. For example, the start point 222 can be the physical location 226 of the traveler. In a different example, the start point 222 can represent the physical location 226 determined by the user for boarding for transportation. In another example, the start point 222 can represent the physical location 226 where the user requests to pick up the animal, the objects, or a combination thereof for transportation.

The destination point 224 is defined as a place desired by the user to be transported to. For example, the destination point 224 can represent the physical location 226 desired by the user to be transported based on the destination information 210.

A path 228 is defined as a passage connecting one geographic location to another geographic location. For example, the path 214 can be the passage for navigation connecting an instance of the physical location 208 to another instance of the physical location 208.

Figure 3:
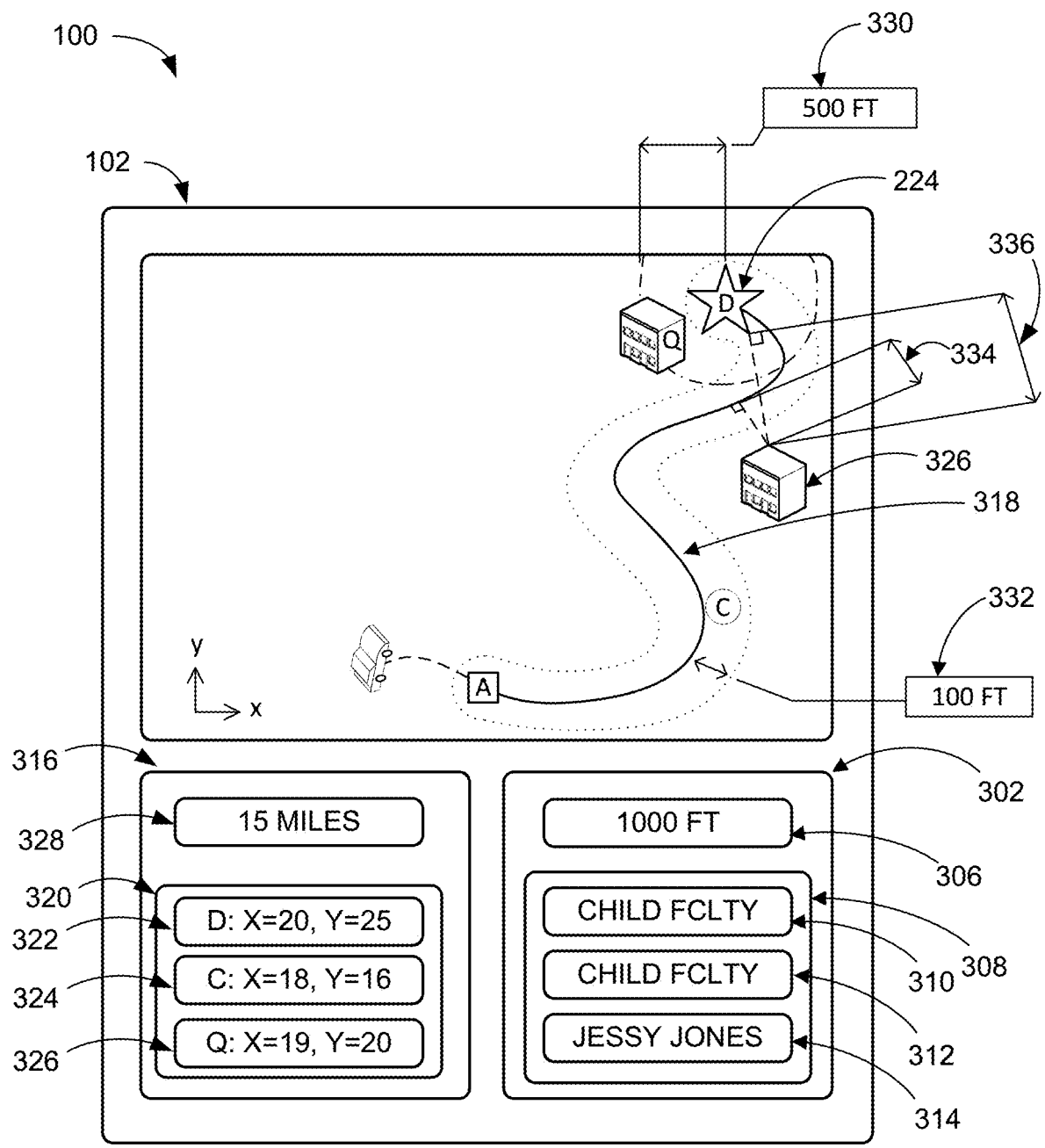
FIG. 3 is an example of a geographic limitation and a route information of the navigation system.

Referring now to FIG. 3, therein is shown an example of a geographic limitation 302 of the navigation system 100. The geographic limitation 302 is defined as a rule regulating a movement for transportation. The geographic limitation 302 can include various constraint regulating the movement of the vehicle for transportation. For example, the geographic limitation 302 can include a distance limitation threshold 306, a prohibited access 308, or a combination thereof.

The distance limitation threshold 306 is defined as a metric used for comparison for determining the constraint regulating the movement based on a distance of travel. For example, the distance limitation threshold 306 can be represented in an alphanumeric combination of A to Z, 0 to 9, or a combination thereof. For a specific example, "5 MILES" can represent the distance limitation threshold 306 of 5 miles.

The prohibited access 308 is defined as a rule regulating the movement. The prohibited access 308 can include various constraints regulating the movement. For example, the prohibited access 308 can include a prohibited destination access 310, a prohibited proximity access 312, a prohibited pass-through access 314, or a combination thereof.

The prohibited destination access 310 is defined as a rule regulating the movement to a destination. For example, the prohibited destination access 310 can regulate the movement to the destination point 224 based on the destination name 212 of FIG. 2 included in the prohibited destination access 310 matching the name of the POI 230 of FIG. 2 located at the destination point 224. In a different example, the prohibited destination access 310 can regulate the movement to the destination point 224 based on a restricted class included in the prohibited destination access 310 matching the classification of the POI 230 at the destination point 224. For a specific example, the prohibited destination access 310 of "Child Facility" can prevent the movement to the POI 230 classified as "Child Facility." In this specific example, the "Child Facility" can represent a daycare, an elementary school, a middle school, a high school, or a combination thereof. In another example, the prohibited destination access 310 can regulate the movement to the destination point 224 based on the distance from the start point 222 to the destination point 224 meeting or exceeding the distance limitation threshold 306.

The prohibited proximity access 312 is defined as a rule regulating the movement to an area within a proximity threshold distance 330 from the prohibited proximity access 312. The proximity threshold distance 330 is defined as metric used for comparison for determining the constraint regulating the movement based on the geographic proximity between the destination and the POI 230 classified as the prohibited proximity access 312. For example, the proximity threshold distance 330 can be represented in an alphanumeric combination of A to Z, 0 to 9, or a combination thereof. For a specific example, "500 ft" can represent the distance limitation threshold 306 of 500 feet.

For a specific example, the prohibited proximity access 312 of "Child Facility" and the proximity threshold distance 330 of "1000 ft (feet)" can prevent the movement to the destination point 224 located within 1000 ft of a daycare, an elementary school, a middle school, a high school, or a combination thereof.

The prohibited pass-through access 314 is defined as a constraint regulating the movement through a geographic area. For example, a prohibited pass-through access 314 can regulate the movement through an area within a pass-through threshold distance 332 from the prohibited pass-through access 314. For a specific example, the prohibited pass-through access 314 of "Child Facility" and the prohibited pass-through threshold distance 332 of "100 ft" can prevent the movement if the path 228 of FIG. 2 of travel is located within 100 ft. of the "Child Facility."

In a different specific example, the prohibited pass-through access 314 of "watershed" and the prohibited pass-through threshold distance 334 of "1000 ft" can prevent the movement if the path 228 of travel is located within 100 ft. of the "watershed" including rivers, lake, pond, streams, or a combination thereof.

The pass-through threshold distance 332 is defined as metric used for comparison for determining the constraint regulating the movement through an area. For example, the pass-through threshold distance 332 can be represented in an alphanumeric combination of A to Z, 0 to 9, or a combination thereof. For a specific example, "500 ft." can represent the pass-through threshold distance 332 of 500 feet.

The pass-through threshold distance 332 can also be the metric used for comparison for determining the constraint regulating the movement based on the limiting value. For example, the pass-through threshold distance 332 can include the altitude restriction providing the maximum altitude that can be traveled through. For a specific example, the pass-through threshold distance 332 of "MAX ALTITUDE: 5000 ft." can represent the limiting value providing restriction of movement above 5000 ft. In a different specific example, the pass-through threshold distance of "MIN ALTITUDE: 0 ft." can represent the limiting value providing restriction of movement below sea level, for example, New Orleans La. where risk of natural disasters such as flooding can be present.

FIG. 3 also shows an example of a provisional information 316 of the navigation system 100. The provisional information 316 is defined as an interim information for traveling to the destination. For example, the provisional information 316 can include a provisional route 318, a provisional POI 320, a POI-route distance 334, a POI-destination distance 336, or a combination thereof.

The provisional route 318 is defined as the path 228 of FIG. 2 connecting the start point 222 of FIG. 2 and the destination point 224. The provisional route 318 can represent the path 228 connecting multiple instances of the start point 222, the destination point 224, or a combination thereof. For example, there can be multiple instances of the transportation request 220 of FIG. 2 suggesting multiple instances of the destination point 224, the start point 222, or a combination thereof. For a specific example, the provisional route 318 can be the path 228 connecting the first instance of the start point 222 denoted A of FIG. 2, the second instance of the start point 222 denoted B of FIG. 2, the first instance of the destination point 224 denoted E of FIG. 2, the second instance of the destination point 224 denoted D of FIG. 2, or a combination thereof.

The POI-route distance 334 is defined as a distance between the POI 230 of FIG. 2 and the provisional route 318. For example, the POI-route distance 334 can be the shortest distance between the physical location 226 of the POI 230 and the provisional route 318. In this example, the POI-route distance 334 can be based on the distance of the line perpendicular to the tangent line of the provisional route 318 using the Euclidean geometry theory.

The POI-destination distance 336 is defined as a distance between the POI 230 and the destination point 224. For example, the POI-destination distance 336 can be the distance of the provisional route 318 along the path 228. In a different example, the POI-destination distance 336 can be the straight-line distance between the POI 230 and the destination point 224.

A route distance 328 is defined as the distance between the start point 222 and the destination point 224. For example, the route distance 328 can be the distance between the first instance of the start point 222 denoted A of FIG. 2, the second instance of the start point 222 denoted B of FIG. 2, the first instance of the destination point 224 denoted E of FIG. 2, the second instance of the destination point 224 denoted D of FIG. 2, or a combination thereof.

The provisional POI 320 is defined as the interim point of interest for determining a restriction to travel the provisional route 318. For example, the provisional POI 320 can include a destination POI 322, a route POI 324, a proximity POI 326, or a combination thereof.

The destination POI 322 is defined as the POI 230 located at the destination point 224. For example, the destination POI 322 can be the POI 230 located at the destination point 224 of the provisional route 318. The route POI 324 is defined as the POI 230 located within the pass-through threshold distance 332 from the provisional route 318. For example, the POI 230 denoted C of FIG. 3 can represent the route POI 324 based on the POI 230 located within the pass-through threshold distance 332 of 100 ft from the provisional route 318.

The proximity POI 326 is defined as the POI 230 located within the proximity threshold distance 330 from the destination point 224. For example, the POI 230 denoted Q of FIG. 3 can represent the proximity POI 326 located within the proximity threshold distance 330 of 500 ft from the destination point 224 denoted D of FIG. 3.

Figure 4:
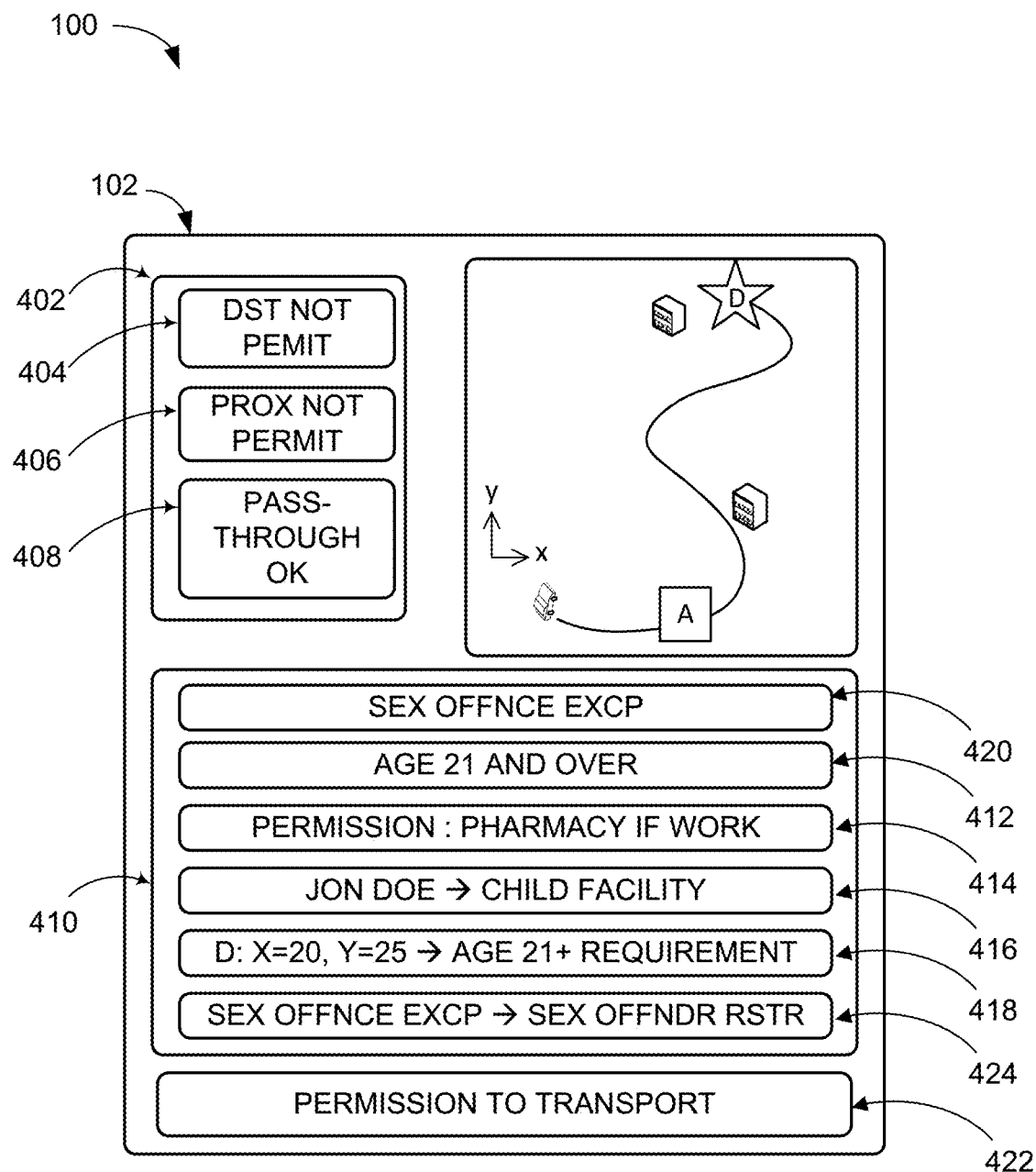
FIG. 4 is an example of a rule information and a navigation permission of the navigation system.

Referring now to FIG. 4, therein is shown an example of a navigation restriction 402 and a rule information 410 of the navigation system 100. The navigation restriction 402 is defined as a determination of a movement constraint. The navigation restriction 402 can include a destination restriction 404, a proximity restriction 406, a pass-through restriction 408, or a combination thereof.

The destination restriction 404 is defined as the determination to prevent the movement to the destination point 224 of FIG. 2. For example, destination restriction 404 can be the determination to prevent the movement to the physical location 226 of FIG. 2 including the destination point 224 included in the prohibited destination access 310 of FIG. 3.

The proximity restriction 406 is defined as the determination to prevent the travel to the geographic area within the proximity threshold distance 330 of FIG. 3 from the prohibited proximity access 312. For example, the proximity restriction 406 can be the determination to prevent travel to the destination point 224 located within the proximity threshold distance 330 from the prohibited proximity access 312. For example, the proximity restriction 406 can include the distance between the proximity POI 326 and the destination point 224, an identification of the POI 230 of FIG. 2, or a combination thereof. For example, "Movement Prohibited, Child Facility located 50 ft. from the destination" can represent the determination to prevent travel to the destination point 224 based on the "Child Facility located 50 ft. from the POI 230.

The pass-through restriction 408 is defined as the determination to prevent the movement through the provisional route 318 of FIG. 3 based on the POI 230 in the prohibited pass-through access 314 of FIG. 3 located within the pass-through threshold distance 332 of FIG. 3 from the provisional route 318. The prohibited pass-through access 314 can include the name of the POI 230, the class of the POI 230, the distance between the route POI 324 of FIG. 3 and the provisional route 318, or a combination thereof. For example, the prohibited pass-through access 314 can be "Child Facility" and the pass-through threshold distance 332 can be 50 ft. In this example, if the Day Care facility is located 20 ft. from the provisional route 318, the pass-through restriction 408 can be determined based on the Child Facility located within 50 ft of the provisional route 318.

The rule information 410 is defined as a guideline for determining the authorization for travel. The rule information 410 can include a POI restriction 412, a traveler restriction information 416, a POI restriction information 418, or a combination thereof.

The POI restriction 412 is defined as a rule for determining access to the POI 230. The POI restriction 412 can represent the guideline for determining the access to the POI 230 in various ways. For example, "Age 21+" can represent the guideline of permitting access only to persons 21 years or older. In another example, "John Doe not permitted" can represent the guideline for preventing access to person named John Doe to the POI 230.

The restriction override 414 is defined as an instruction to nullify the navigation restriction 402. The restriction override 414 can instruct the nullifying of the navigation restriction 402 in various ways. For a specific example, the "Permission access regardless of Child Facility within 500 ft of the destination, Condition=Destination is the registered sex offender's residence or workplace" representing the restriction override 414 can instruct to nullify the navigation restriction 402 preventing the vehicle transporting the registered sex offender to his residence located within 500 ft of the Child Facility. For a different specific example, the "Permission to access pharmacy workplace" can instruct to nullify the navigation restriction 402 preventing the vehicle transporting the traveler who is on a parole for "illegal prescription drug offence" and otherwise restricted from traveling to a place such as a pharmacy providing drugs.

The traveler restriction information 416 is defined as an association between the traveler information 204 of FIG. 2, the geographic limitation 302 of FIG. 3, or a combination thereof. For example, the traveler restriction information 416 can provide an association between the traveler information 204 and the geographic limitation 302 including the prohibited access 308 of FIG. 3, the distance limitation threshold 306 of FIG. 3, or a combination thereof.

The POI restriction information 418 is defined as association between the provisional POI 320 of FIG. 3, the POI restriction 412, or a combination thereof. For example, the restriction information 418 can provide the association between the provisional POI 320 including the destination POI 322 of FIG. 3, the route POI 324 of FIG. 3, the proximity POI 326 of FIG. 3, the POI restriction 412, or a combination thereof.

The rule information 410 can further include a restriction override 414, an override information 420, a permitted destination 424, or a combination thereof. The override information 420 is defined as association between the restriction override 414, the permitted destination 424, or a combination thereof. For example, the override information 420 can provide the association between the permitted destination 424, the restriction override 414 or a combination thereof.

The permitted destination 424 is defined as constraint permitted to be nullified. For a specific example, the "Sex Offender Home Residence Exception" can represent the restriction override 414. In this specific example, the override information 420 can represent the information associating the restriction override 414 of "Sex Offender Home Residence Exception" to the permitted destination 424 of "Child Facility." Continuing in this specific example, the permitted destination 424 of "Child Facility" can nullify the navigation restriction 402 of "Child Facility."

The FIG. 4 also shows an example of a navigation permission 422 of the navigation system 100. The navigation permission 422 is defined as an authorization to initiate travel. For example, the navigation permission 422 can authorize the vehicle, a vessel, or a combination thereof to transport the traveler, objects, animal, or a combination thereof from the start point 222 of FIG. 2 to the destination point 224.

Figure 5:
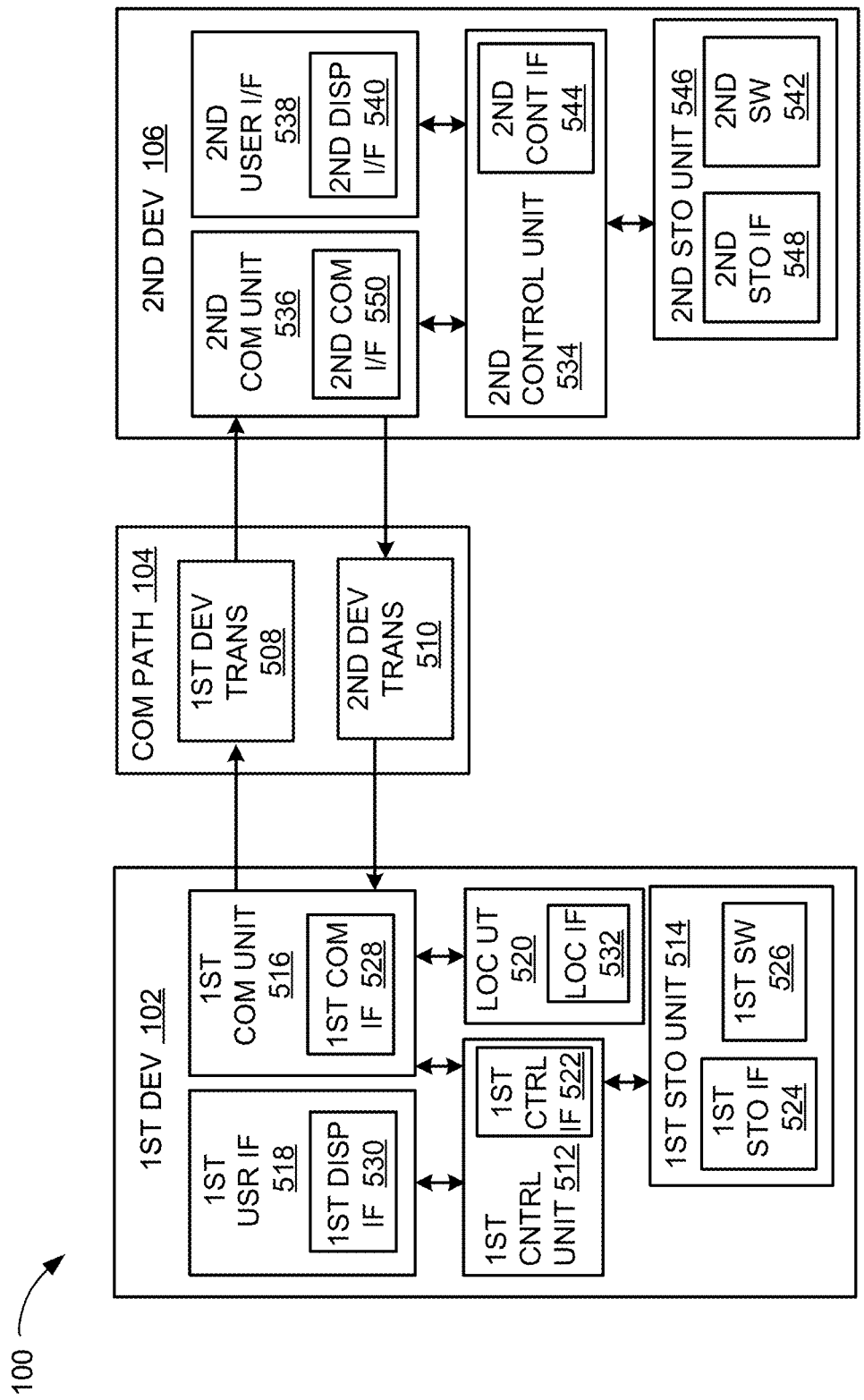
FIG. 5 is an exemplary block diagram of the navigation system.

Referring now to FIG. 5, therein is shown an exemplary block diagram of the navigation system 100. The navigation system 100 can include the first device 102, the communication path 104, and the second device 106. The first device 102 can send information in a first device transmission 508 over the communication path 104 to the second device 106. The second device 106 can send information in a second device transmission 510 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 512, a first storage unit 514, a first communication unit 516, a first user interface 518, and a location unit 520. The first control unit 512 can include a first control interface 522. The first control unit 512 can execute a first software 526 to provide the intelligence of the navigation system 100. The first control unit 512 can be implemented in a number of different manners. For example, the first control unit 512 can be a processor, an embedded processor, a microprocessor, a hardware control logic, a hardware finite state machine (FSM), a digital signal processor (DSP), or a combination thereof. The first control interface 522 can be used for communication between the first control unit 512 and other functional units in the first device 102. The first control interface 522 can also be used for communication that is external to the first device 102.

The first control interface 522 can receive information from the other functional units or from external sources, or can transmit information to the other functional units or to external destinations. The external sources and the external destinations refer to sources and destinations physically separate from the first device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The location unit 520 can generate location information, current heading, and current speed of the first device 102, as examples. The location unit 520 can be implemented in many ways. For example, the location unit 520 can function as at least a part of a global positioning system (GPS), an inertial navigation system, a cellular-tower location system, a pressure location system, or any combination thereof.

The location unit 520 can include a location interface 532. The location interface 532 can be used for communication between the location unit 520 and other functional units in the first device 102. The location interface 532 can also be used for communication that is external to the first device 102.

The location interface 532 can receive information from the other functional units or from external sources, or can transmit information to the other functional units or to external destinations. The external sources and the external destinations refer to sources and destinations physically separate from the first device 102.

The location interface 532 can include different implementations depending on which functional units or external units are being interfaced with the location unit 520. The location interface 532 can be implemented with technologies and techniques similar to the implementation of the first control interface 522.

The first storage unit 514 can store the first software 526. The first storage unit 514 can also store the relevant information, such as advertisements, points of interest (POI), navigation routing entries, or any combination thereof.

The first storage unit 514 can be a volatile memory, a nonvolatile memory, an internal memory, an external memory, or a combination thereof. For example, the first storage unit 514 can be a nonvolatile storage such as non-volatile random access memory (NVRAM), Flash memory, disk storage, or a volatile storage such as static random access memory (SRAM).

The first storage unit 514 can include a first storage interface 524. The first storage interface 524 can be used for communication between the location unit 520 and other functional units in the first device 102. The first storage interface 524 can also be used for communication that is external to the first device 102.

The first storage interface 524 can receive information from the other functional units or from external sources, or can transmit information to the other functional units or to external destinations. The external sources and the external destinations refer to sources and destinations physically separate from the first device 102.

The first storage interface 524 can include different implementations depending on which functional units or external units are being interfaced with the first storage unit 514. The first storage interface 524 can be implemented with technologies and techniques similar to the implementation of the first control interface 522.

The first communication unit 516 can enable external communication to and from the first device 102. For example, the first communication unit 516 can permit the first device 102 to communicate with the second device 106, an attachment, such as a peripheral device or a computer desktop, and the communication path 104.

The first communication unit 516 can also function as a communication hub allowing the first device 102 to function as part of the communication path 104 and not limited to be an end point or terminal unit to the communication path 104. The first communication unit 516 can include active and passive components, such as microelectronics or an antenna, for interaction with the communication path 104.

The first communication unit 516 can include a first communication interface 528. The first communication interface 528 can be used for communication between the first communication unit 516 and other functional units in the first device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, a camera, or any combination thereof to provide data and communication inputs. Examples of the first user interface 518 can further include a digital camera, video camera, thermal camera, night vision camera, infrared camera, x-ray camera, or the combination thereof. Examples of the first user interface 518 can also include accelerometer, thermometer, microphone, wireless signal receiver, remote physiological monitoring device, light identifier, or the combination thereof.

The first user interface 518 can include a first display interface 530. The first display interface 530 can include a display, a projector, a video screen, a speaker, a headset, or any combination thereof.

The first control unit 512 can operate the first user interface 518 to display information generated by the navigation system 100. The first control unit 512 can also execute the first software 526 for the other functions of the navigation system 100, including receiving location information from the location unit 520. The first control unit 512 can further execute the first software 526 for interaction with the communication path 104 via the first communication unit 516.

The second device 106 can be optimized for implementing the present invention in a multiple device embodiment with the first device 102. The second device 106 can provide the additional or higher performance processing power compared to the first device 102. The second device 106 can include a second control unit 534, a second communication unit 536, and a second user interface 538.

The second user interface 538 allows a user (not shown) to interface and interact with the second device 106. The second user interface 538 can include an input device and an output device. Examples of the input device of the second user interface 538 can include a keypad, a touchpad, softkeys, a keyboard, a microphone, a camera, or any combination thereof to provide data and communication inputs. Examples of the second user interface 538 can further include a digital camera, video camera, thermal camera, night vision camera, infrared camera, x-ray camera, or the combination thereof. Examples of the second user interface 538 can also include accelerometer, thermometer, microphone, wireless signal receiver, remote physiological monitoring device, light identifier, or the combination thereof. Examples of the output device of the second user interface 538 can include a second display interface 540. The second display interface 540 can include a display, a projector, a video screen, a speaker, a headset, or any combination thereof.

The second control unit 534 can execute a second software 542 to provide the intelligence of the second device 106 of the navigation system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the navigation system 100, including operating the second communication unit 536 to communicate with the first device 102 over the communication path 104.

The second control unit 534 can be implemented in a number of different manners. For example, the second control unit 534 can be a processor, an embedded processor, a microprocessor, a hardware control logic, a hardware finite state machine (FSM), a digital signal processor (DSP), or a combination thereof.

The second control unit 534 can include a second control interface 544. The second control interface 544 can be used for communication between the second control unit 534 and other functional units in the second device 106. The second control interface 544 can also be used for communication that is external to the second device 106.

The second control interface 544 can receive information from the other functional units or from external sources, or can transmit information to the other functional units or to external destinations. The external sources and the external destinations refer to sources and destinations physically separate from the second device 106.

The second control interface 544 can be implemented in different ways and can include different implementations depending on which functional units or external units are being interfaced with the second control interface 544. For example, the second control interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store the relevant information, such as advertisements, points of interest (POI), navigation routing entries, or any combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the navigation system 100 is shown with the second storage unit 546 as a single hierarchy storage system, although it is understood that the navigation system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as non-volatile random access memory (NVRAM), Flash memory, disk storage, or a volatile storage such as static random access memory (SRAM).

The second storage unit 546 can include a second storage interface 548. The second storage interface 548 can be used for communication between the location unit 520 and other functional units in the second device 106. The second storage interface 548 can also be used for communication that is external to the second device 106.

The second storage interface 548 can receive information from the other functional units or from external sources, or can transmit information to the other functional units or to external destinations. The external sources and the external destinations refer to sources and destinations physically separate from the second device 106.

The second storage interface 548 can include different implementations depending on which functional units or external units are being interfaced with the second storage unit 546. The second storage interface 548 can be implemented with technologies and techniques similar to the implementation of the second control interface 544.

The second communication unit 536 can enable external communication to and from the second device 106. For example, the second communication unit 536 can permit the second device 106 to communicate with the first device 102 over the communication path 104.

The second communication unit 536 can also function as a communication hub allowing the second device 106 to function as part of the communication path 104 and not limited to be an end point or terminal unit to the communication path 104. The second communication unit 536 can include active and passive components, such as microelectronics or an antenna, for interaction with the communication path 104.

The second communication unit 536 can include a second communication interface 550. The second communication interface 550 can be used for communication between the second communication unit 536 and other functional units in the second device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second control interface 544.

The first communication unit 516 can couple with the communication path 104 to send information to the second device 106 in the first device transmission 508. The second device 106 can receive information in the second communication unit 536 from the first device transmission 508 of the communication path 104.

The second communication unit 536 can couple with the communication path 104 to send information to the first device 102 in the second device transmission 510. The first device 102 can receive information in the first communication unit 516 from the second device transmission 510 of the communication path 104. The navigation system 100 can be executed by the first control unit 512, the second control unit 534, or a combination thereof.

For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 6 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 520, although it is understood that the second device 106 can also operate the location unit 520.

Figure 6:
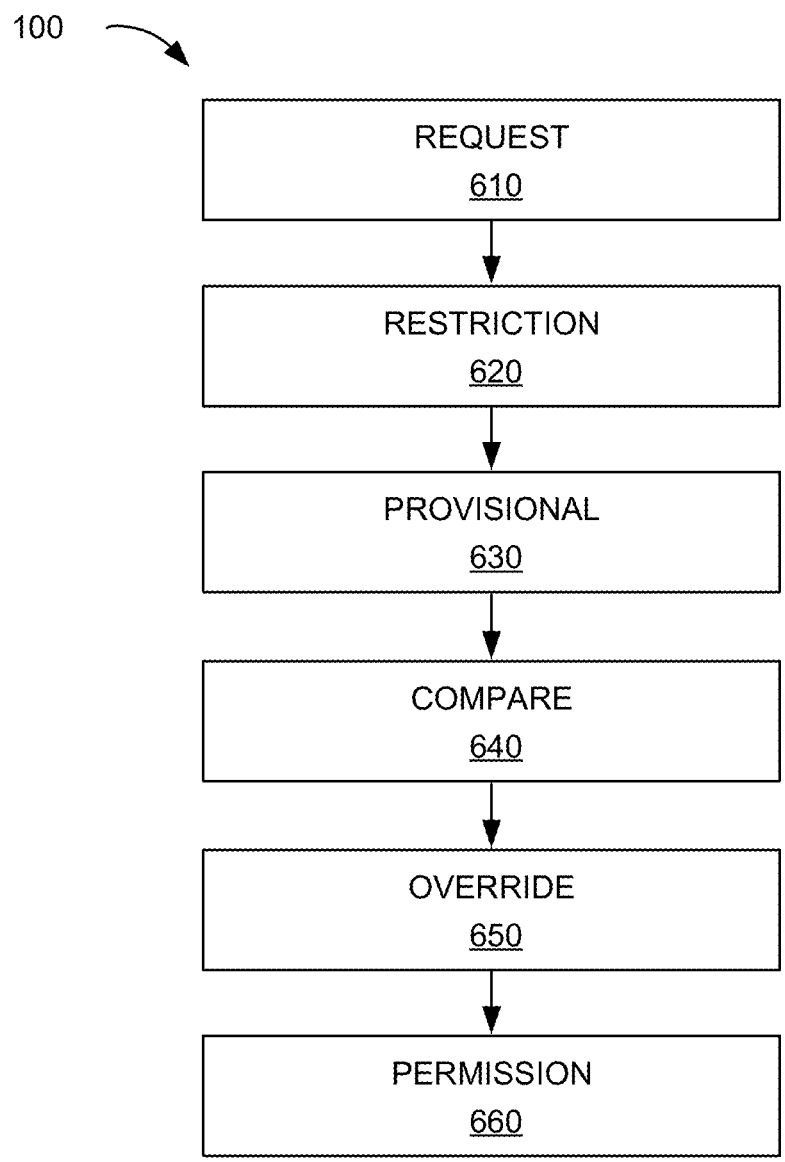
FIG. 6 is a control flow of the navigation system.

Referring now to FIG. 6, therein is shown a control flow of the navigation system 100. The navigation system 100 can include a request module 610. The request module 610 determines the request information 202 of FIG. 2. More specifically, the request module 610 can determine the request information 202 including the transportation request 220 of FIG. 2. The request module 610 can determine the transportation request 220 in various ways.

For example, the request module 610 can determine the transportation request 220 based on receiving the traveler information 204 of FIG. 2, the destination information 210 of FIG. 2, or a combination thereof.

The request module 610 can receive the traveler information 204 in various ways. For example, the request module 610 can receive the traveler information 204 based on capturing the traveler information 204 from the user through the first user interface 518 of FIG. 5, receiving from the second device 106 of FIG. 1 through the first communication unit 516 of FIG. 5, retrieving from the first storage unit 514 of FIG. 5, or a combination thereof.

For example, the request module 610 can capture the traveler information 204 including the traveler identification 206 of FIG. 2. In this example, the request module 610 can capture the alphanumeric value of A through Z, 0 through 9, or a combination thereof representing the traveler identification 206. For a specific example, the request module 610 can capture the traveler identification 206 based on receiving "JANE DOE," "jDoe123," "999-999," representing the traveler name, the traveler account number, and the phone number of the traveler, respectively. In a different specific example, the request module 610 can receive the traveler identification 206 from the second device 106, retrieve the traveler identification 206 from the first storage unit 514, or a combination thereof.

In another example, the request module 610 can receive the traveler information 204 including the traveler attribute 208 of FIG. 2. In this example, the request module 610 can capture the alphanumeric value of A through Z, 0 through 9, or a combination thereof representing the traveler attribute 208. For a specific example, the request module 610 can capture the traveler attribute 208 based on receiving "83," "DEMENTIA," "PAROLE-STATUS," representing the traveler age, the traveler condition, and the legal status of the traveler, respectively. In a different specific example, the request module 610 can receive the traveler attribute 208 from the second device 106, retrieve the traveler attribute 208 from the first storage unit 514, or a combination thereof.

In a further example, the request module 610 can determine the transportation request 220 based on receiving the destination information 210 from the user through the first user interface 518, received from the second device 102 through the first communication unit 516, retrieved from the first storage unit 514, or a combination thereof. For example, the request module 610 can capture the alphanumeric value of A through Z, 0 through 9, or a combination thereof representing the destination information 210 from the user of the navigation system 100. For a specific example, the request module 610 can capture the destination information 210 based on capturing "Hotel Pennsylvania," "401 7th Ave, New York, N.Y., 10001," "Hotel next to Madison Square Garden," representing the destination name 212 of FIG. 2, the destination address 214 of FIG. 2, and the destination description 216 of FIG. 2, respectively. The request module 610 can also determine the transportation request 220 from the second device 106, retrieve from the first storage unit 514, or a combination thereof.

The request module 610 can also determine the information priority 218 of FIG. 2 for each instance of the traveler information 204. For example, the request module 610 can determine the information priority 218 based on retrieving the information priority 218 from the user through the first user interface 518, the second device 106 through the first communication unit 516, the first storage unit 514, or a combination thereof. For a specific example, the request module 610 can retrieve the information priority 218 of "1" associated to the traveler identification 206 representing the traveler name. In a different example, the request module 610 can retrieve the information priority 218 of "10" associated to the traveler attribute 208 representing the legal status of the traveler.

The request module 610 can determine the start point 222 of FIG. 2 for travel. The request module 610 can determine the start point 222 in a number of ways. For example, the request module 610 can determine the start point 222 based on a GPS, a location beacon, a cellular signal, an inertial measurement unit (IMU), or a combination thereof. In this example, the request module 610 can determine the start point 222 based on a movement tracking, a position trilateration, or a combination thereof through the location unit 520 of FIG. 5.

For a different example, the request module 610 can determine the start point 222 based on the Cartesian coordinate system. In this example, the direction denoted "x" of FIG. 2 can represent the horizontal component and the direction denoted "y" of FIG. 2 can represent the vertical component of the start point 222 of the traveler on the map. In a different example, the request module 610 can determine the start point 222 based on the Cylindrical and spherical coordinate systems, Homogeneous coordinate system, or a combination thereof.

The request module 610 can also determine the destination point 224 of FIG. 2. The request module 610 can determine the destination point 224 based on the destination information 210. For example, the request module 610 can determine the destination point 224 based on the destination information 210 including the destination name 212, the destination address 214, the destination description 216, or a combination thereof.

For a specific example, the request module 610 can determine the "38°48'05"N, 77°03'51"W" as the physical location 226 of FIG. 2 representing the destination point 224 in the Cartesian coordinate system based on "USPTO" representing the destination name 212. In another specific example, the request module 610 can determine "38°48'05"N, 77°03'51"W" as the destination point 224 in the Cartesian coordinate system based on the "600 Dulany St, Alexandria, Va. 22314" representing the destination address 214 as a mailing address. In a different specific example, the request module 610 can determine the mailing address of "1600 Pennsylvania Ave NW, Washington, D.C. 20500" as the destination point 224 based on the "Residence of the President of the United States of America" representing the destination description 216. The request module 610 can communicate the request information 202 including the traveler information 204, the destination information 210, the information priority 218, the transportation request 220, the start point 220, the destination point 224, or a combination thereof to a restriction module 620.

The navigation system 100 can include the restriction module 620, which can couple to the request module 610. The restriction module 620 determines the geographic limitation 302 of FIG. 3. The restriction module 620 can determine the geographic limitation 302 including the distance limitation threshold 306 FIG. 3, the prohibited access 308 FIG. 3, or a combination thereof in various ways. The restriction module 620 can determine the geographic limitation 302 representing the distance limitation threshold 306 based on the traveler information 204 representing the traveler identification 206, the traveler attribute 208, or a combination thereof.

For example, the restriction module 620 can determine the distance limitation threshold 306 based on the traveler identification 206 representing the traveler name, the traveler account number, the phone number, or a combination thereof. In this example, the restriction module 620 can search the traveler restriction information 416 of FIG. 4 for the geographic limitation 302 representing the distance limitation threshold 306 associated to the traveler identification 206.

For a specific example, the restriction module 620 can determine "unlimited distance" as the distance limitation threshold 306 based on determining "unlimited distance" associated to the traveler identification 206 representing the traveler name of "John Doe" in the traveler restriction information 416. In another specific example, the restriction module 620 can determine "100 miles" as the distance limitation threshold 306 based on determining "100 miles" associated to the traveler identification 206 representing the traveler account number of "#123,456,789" in the traveler restriction information 416. In a different specific example, the restriction module 620 can determine "50 miles" as the distance limitation threshold 306 based on determining "50 miles" associated to the traveler identification 206 representing the phone number of "999-9999" in the traveler restriction information 416.

The restriction module 620 can also determine the distance limitation threshold 306 based on the traveler information 204 representing the traveler attribute 208 including the traveler age, the traveler condition, the legal status, or a combination thereof. For a specific example, the restriction module 620 can determine "unlimited" as the distance limitation threshold 306 based on determining the distance of "unlimited" associated to the traveler attribute 208 representing the traveler age between 18 and 70 years old in the traveler restriction information 416. Continuing in this specific example, the restriction module 620 can determine "10 miles" as the distance limitation threshold 306 based on determining the distance of "10 miles" associated to the traveler attribute 208 representing the traveler age of 0 to 18 years old, greater than 70 years old, or a combination thereof in the traveler restriction information 416.

In another specific example, the restriction module 620 can determine "2 miles" as the distance limitation threshold 306 based on the distance of "2 miles" associated to the traveler attribute 208 representing the traveler condition of "dementia" in the traveler restriction information 416. In a further specific example, the restriction module 620 can determine "10 miles" as the distance limitation threshold 306 based on the distance of "10 miles" associated to the traveler attribute 208 representing the legal status of "parole status; 10-mile restriction."

The restriction module 620 is not limited to determining the distance limitation threshold 306 based on the distance associated to the specific instances of the traveler information 204 including the traveler identification 206 or the traveler attribute 208. For example, the restriction module 620 can determine the distance limitation threshold 306 based on multiple instances of the traveler information 204.

For example, the restriction module 620 can determine the distance limitation threshold 306 based on searching the traveler restriction information 416 for the distance limitation threshold 306 associated to the combination of the traveler age and the traveler condition. For a specific example, the restriction module 620 can determine "0 mile"

as the distance limitation threshold 306 based on the distance limitation threshold 306 of "0 miles" associated to the combination of the traveler age of "80 years old" and the traveler condition of "dementia" in the traveler restriction information 416.

In another example, the restriction module 620 can determine the distance limitation threshold 306 based on comparing the information priority 218 associated to the traveler information 204. In this example, the restriction module 620 can compare the information priority 218 associated to each instance of the traveler information 204. Based on the comparison, the restriction module 620 can select the traveler information 204 with the highest or the lowest value of the information priority 218 based on the user preference. Continuing in this example, the restriction module 620 can thereafter determine the distance limitation threshold 306 based on the traveler information 204 associated with the highest or the lowest value of the information priority 218.

For a specific example, the restriction module 620 can search the traveler restriction information 416 to retrieve the information priority of "2" associated to the traveler name of "JOHN DOE" and the information priority 218 of "5" associated to the legal status of "parole status, 2-mile restriction". In this example, the restriction module 620 can compare the information priority 218 of the traveler name and the information priority 218 of the legal status and select the traveler attribute 208 associated with the highest value of the information priority 218. Based on the comparison, the restriction module 620 can determine the distance limitation threshold 306 of "2 miles" based on the legal status having the highest value of the information priority 218.

In another example, the restriction module 620 can determine the geographic limitation 302 representing the prohibited access 308. For example, the restriction module 620 can determine the prohibited access 308 including the prohibited destination access 310, the prohibited proximity access 312 of FIG. 3, the proximity threshold distance 330 of FIG. 3, the prohibited pass-through access 314 of FIG. 3, the pass-through threshold distance 332 of FIG. 3, or a combination thereof based on the traveler information 204. More specifically, the restriction module 620 can search the rule information 410 of FIG. 4 representing the traveler restriction information 416 of FIG. 4 to determine the prohibited access 308 based on determining the prohibited access 308 associated to the traveler information 204.

The restriction module 620 can determine the rule information 410 representing the traveler restriction information 416 based on retrieving the traveler restriction information 416 from the first storage unit 514, retrieving from the second device 106 through the first communication unit 516, capturing from the user through the first user interface 518, capturing from the user through the second user interface 538 of FIG. 5, or a combination thereof.

For example, the restriction module 620 can determine the prohibited access 308 based on the traveler information 204 including the traveler identification 206, the traveler restriction information 416, or a combination thereof. In this example, the restriction module 620 can search the traveler restriction information 416 to determine the prohibited access 308 associated to the traveler identification 206.

For a specific example, the traveler identification 206 representing the traveler name can be "JON DOE." In this specific example, the prohibited destination access 310 of "Outside the State of California," the prohibited proximity access 312 of "Establishment Providing Alcohol," the proximity threshold distance 330 of "1000 ft," the prohibited pass-through access 314 of "Child Facility," the prohibited pass-through threshold distance 332 of "100 ft," or a combination thereof can be associated to "JON DOE" in the traveler restriction information 416. Continuing in this specific example, the restriction module 620 can search the rule information 410 for "JON DOE." Continuing in this specific example, the restriction module 620 can determine the prohibited destination access 310 of "State border," the prohibited proximity access 312 of "Alcohol Establishment," the proximity threshold distance 330 of "1000 ft," or a combination thereof as the prohibited access 308. Furthermore, the restriction module 620 can also determine the prohibited pass-through access 314 of "Child Facility," the prohibited pass-through threshold distance 332 of "100 ft," based on the prohibited access 308 associated to the traveler name of "JON DOE."

The restriction module 620 is not limited to determining the various instances of the prohibited access 308 based on the traveler identification 206 representing the traveler name. For example, the restriction module 620 can determine the prohibited access 308 based on the traveler identification 206 representing the traveler account number, the phone number, or a combination thereof associated to the prohibited access 308 in the rule information 410 representing the traveler restriction information 416.

In another example, the restriction module 620 can also determine the prohibited access 308 based on the traveler information 204 including the traveler attribute 208, the rule information 410, or a combination thereof. In this example, the restriction module can search the rule information 410 to determine the prohibited access 308 associated with the traveler attribute 208 to determine the prohibited access 308.

For example, the restriction module 620 can determine the prohibited access 308 based on the prohibited access 308 associated to the traveler attribute 208 representing the traveler age. For a specific example, the traveler age can be "20." In this specific example, the restriction module 620 can search the rule information 410 for the traveler age of "20." Based on finding the traveler age of "20," the restriction module 620 can determine the prohibited access 308 including the prohibited destination access 310, the distance limitation threshold 306, the prohibited proximity access 312, the proximity threshold distance 330, the prohibited pass-through access 314, the pass-through threshold distance 443, or a combination thereof associated to the traveler age of "20." Continuing in this specific example, the restriction module 620 can determine the prohibited destination access 310 of "over 21 establishment," the prohibited proximity access 312 of "Adult Establishment," the proximity threshold distance 330 of "50 ft," or a combination thereof based on the prohibited destination access 310 and the prohibited proximity access 312 associated with the traveler age of "20."

In another example, the restriction module 620 can determine the prohibited access 308 based on the prohibited access 308 associated with the traveler attribute 208 representing the traveler condition. For a specific example, the traveler condition can be "enochlophobia." In this specific example, the restriction module 620 can search the rule information 410 for the prohibited access 308 representing the prohibited destination access 310, the prohibited proximity access 312, the prohibited pass-through access 314, or a combination thereof associated with the traveler condition of "enochlophobia." Continuing in this specific example, the restriction module 620 can determine the prohibited destination access 310 of "High density foot traffic (HDFT)," the prohibited proximity access 312 of "HDFT," the proximity threshold distance 330 of "10 ft," or a combination thereof based on the prohibited destination access 310 and the prohibited proximity access 312 associated with the traveler condition of "enochlophobia."

In a different example, the restriction module 620 can determine the prohibited access 308 based on the prohibited access 308 associated with the traveler attribute 208 representing the legal status. For a specific example, the legal status can be "Sex Offender." In this specific example, the restriction module 620 can search the rule information 410 for the prohibited access 308 including the prohibited destination access 310, the prohibited proximity access 312, the proximity threshold distance 330, the prohibited pass-through access 314, the pass-through threshold distance 332, or a combination thereof associated with the legal status of "Sex Offender." Continuing in this specific example, the restriction module 620 can determine the prohibited destination access 310 of "Child Facility," the prohibited proximity access 312 of "Child Facility," the proximity threshold distance 330 of "1000 ft," the prohibited pass-through access 314 of "Child Facility," the pass-through threshold distance 332 of "50 ft.," or a combination thereof based on the prohibited access 308 associated to the legal status of "Sex Offender."

It has been discovered that the navigation system 100 determining the geographic limitation 302 representing the prohibited access 308 based on the geographic limitation 302 associated with the traveler attribute 208 improves the functionality of the navigation system 100. For example, by determining the geographic limitation 302 based on the geographic limitation 302 associated to the traveler attribute 208, the navigation system 100 can determine the geographic limitation 302 without the need to search for the geographic limitation 302 associated to the traveler identification 206. By eliminating the need to search the geographic limitation 302 associated with a vast number of the traveler identification 206 that can exist in the real world, the navigation system 100 can reduce the overall process imposed on the first device 102, reduce the memory storage required to store the traveler identification 206, or a combination thereof. As a result, the navigation system 100 can allocate the saved processing power to other function, reduce the energy consumption to extend the operation life of the navigation system 100, allocate the saved memory storage to store other information, or a combination thereof.

In addition, it has been discovered that the navigation system 100 determining the geographic limitation 302 based on the geographic limitation 302 associated with the traveler attribute 208 improves the functionality of the navigation system 100. For example, the traveler restriction information 416 in the second device 106 can continuously change from time to time as the situation in the real-world change. Continuing in this example, the traveler attribute 208 can be captured by the first device 102 and the traveler restriction information 416 can be stored in the second device 106.

In the navigation system 100 using the distributed architecture, the first device 102 can communicate the traveler attribute 208 to the second device 106, the second device 106 can communicate the traveler restriction information 416 to the first device 102, or a combination thereof. Based on the association included in the traveler restriction information 416, the navigation system 100 can determine the geographic limitation 302 at the first device 102, the second device 106, or a combination thereof. As a result, the navigation system 100 using the distributed architecture is capable of dynamically determining the real-time updating instance of the geographic limitation 302 as the traveler restriction information 416 is continuously updated to reflect the real-world change.

To the contrary, the determination of the real-time updated instance of the geographic limitation 302 is not possible in a non-distributed architecture system, for example, where both the process of capturing of the traveler attribute 208 and the storing of the traveler restriction information 416 occurs in the first device 102. In this example, the determination of the real-time updating of the geographic limitation 302 is not possible because the traveler restriction information 416 stored in the first device 102 is disconnected from the outside world and cannot reflect the continuously changing real-world change.

It has also been discovered that the navigation system 100 determining the geographic limitation 302 based on the geographic limitation 302 associated with the traveler attribute 208 improves the privacy of the user of the first device 102. For example, by determining the geographic limitation 302 based on the geographic limitation 302 associated to the traveler attribute 208, the user can request the transportation request 220 without providing extra unnecessary personal identification information. As a result, the navigation system 100 can improve the privacy of the user of the first device 102 by minimizing the traveler information 204 to be provided to the navigation system 100. The restriction module 620 can communicate the geographic limitation 302 to a provisional module 630.

The navigation system 100 can include the provisional module 630, which can couple to the restriction module 620. The provisional module 630 generates the provisional information 316 of FIG. 3. For example, the provisional module 630 can generate the provisional information 316 including the provisional route 318 of FIG. 3, the provisional POI 320 of FIG. 3, or a combination thereof.

The provisional module 630 can generate the provisional route 318 in various ways. For example, the provisional module 630 can generate the provisional route 318 based on the start point 222, the destination point 224, or a combination thereof. In this example, the provisional module 630 can generate the provisional route 318 based on the path 228 of FIG. 2 between the start point 222 and the destination point 224.

For a specific example, the provisional module 630 can retrieve the start point 222 denoted as A of FIG. 2 and the destination point 224 denoted as D of FIG. 2 from the second device 106, through the first communication unit 516, from the first storage unit 514, captured through the first user interface 518, or a combination thereof. In this specific example, the provisional module 630 can generate the provisional route 318 based on the path 228 between A and D as the provisional route 318.

The provisional module 630 can generate the provisional route 318 based on multiple instances of the start point 222. For a specific example, the start point 222 denoted as A of FIG. 2 can represent the first instance of the start point 222 for the first traveler and the start point 222 denoted as B of FIG. 2 can represent the second instance of the start point 222 for the second traveler. Continuing in this specific example, D of FIG. 2 can represent the destination point 224. In this specific example, the provisional module 630 can generate the path 228 between A and B as the first instance of the provisional route 318, the path 228 between B and D as the second instance of the provisional route 318, or a combination thereof.

In a different specific example, the destination point 224 of the first traveler and the second traveler can be different.

In this specific example, D of FIG. 2 can represent the destination point 224 of the first traveler and E of FIG. 2 can represent the destination point 224 of the second traveler. In this example, the provisional module 630 can determine the path 228 between A and B as the first instance of the provisional route 318, the path 228 between B and D as the second instance of the provisional route 318, the path 228 between D and E as the third instance of the provisional route 318, or a combination thereof. The provisional module 630 can also generate a single instance of the provisional route 318 from A to E through B and D.

In another example, the provisional module 630 can also generate the provisional route 318 considering various other factors such as the total time required to navigate the path 228 to reach the destination name 212, the distance of the path 228, toll required to navigate the path 228, the provisional POI 320 as the waypoint, the traveler information 204, or a combination thereof. For example, the dotted instance of the path 228 denoted Z of FIG. 2 can represent the path 228 where a toll is required. In this example, the provisional module 630 can determine Z as the provisional path 228 based on the user preference preferring shorter distance of the path 228 over the path 228 not requiring the toll.

In another example, the provisional module 630 can generate the provisional route 318 based on the traveler information 204. For example, the provisional module 630 can include a waypoint for generating the provisional route 318, for example, an agricultural inspection station as the waypoint based on the traveler information 204 including the traveler attribute 208 such as the vehicle carrying cargo including plant, livestock, chemicals, other restricted items, or a combination thereof.

The provisional module 630 can also determine the route distance 328 of FIG. 3. For example, the provisional module 630 can determine the route distance 328 based on comparing the physical location 226 of the start point 222 and the destination point 224 of the provisional route 318 for a geographic separation. For a specific example, the route distance 328 can be a linear line distance between the start point 22 and the destination point 224. In a different specific example, the route distance 328 can be the length of the provisional route 318 between the start point 222 and the destination point 224.

In a different example, the provisional module 630 can determine the provisional POI 320 including the destination POI 322 of FIG. 3, the POI-route distance 334 of FIG. 3, POI-destination distance 336 of FIG. 3, the route POI 324 of FIG. 3, the proximity POI 326 of FIG. 3, or a combination thereof in various ways.

For example, the provisional module 630 can determine the destination POI 322 based on the POI 230 of FIG. 2 located at the destination point 224. In this example, the provisional module 630 can compare the physical location 226 of the POI 230 and the physical location 226 of the destination point 224. Based on the match, the provisional module 630 can determine the POI 230 as the destination POI 322.

The provisional module 630 can further determine the POI-route distance 334 based on the physical location 226 of the POI 230 and the provisional route 318. For example, the provisional module 630 can determine the POI-route distance 334 based on measuring the shortest distance between the physical location 226 of the POI 230 and the provisional route 318. In this example, the provisional module 630 can determine the POI-route distance 334 based on the distance of the line perpendicular to the tangent line of the provisional route 318 using the Euclidean geometry theory.

In a different example, the provisional module 630 can determine the POI-destination distance 336 based on the physical location 226 of the POI 230 and the destination point 224. In this example, the provisional module 630 can measure the distance between the physical location 226 of the POI 230 and the destination point 224 to determine the destination distance 336.

In another example, the provisional module 630 can determine the route POI 324 based on comparing the POI-route distance 334 and the pass-through threshold distance 332. Based on the pass-through threshold distance 332 meeting or exceeding the POI-route distance 334, the provisional module 630 can determine the POI 230 as the route POI 325.

For a specific example, the POI 230 denoted "C" of FIG. 3 can be located at "X, Y: 15, 5," the provisional route 318 can be the path 228 between the start point 222 denoted A of FIG. 3, and the destination point 224 can be denoted "D" of FIG. 3. In this specific example, the provisional route 318 can compare the POI-route distance 334 of "C" and the provisional route 318 to the pass-through threshold distance 332. Based on determining the pass-through threshold distance 332 exceeding the POI-route distance 334, the provisional module 630 can determine the POI 230 as the route POI 324.

In a different example, the provisional module 630 can determine the proximity POI 326 based on the destination point 224 and the proximity threshold distance 330. In this example, the provisional module 630 can compare the POI-destination distance 336 with the proximity threshold distance 330. Continuing in this example, the provisional module 630 can determine the proximity POI 326 based on the proximity threshold distance 330 meeting or exceeding the POI-destination distance 336.

For a specific example, the proximity threshold distance 330 can be 600 m (meter). In this specific example, the provisional module 630 can determine the POI 230 located within 600 m of the destination point 224 as the proximity POI 326.

Continuing in this specific example, the physical location 226 of the POI 230 denoted "Q" of FIG. 2 can be "X,Y: 700 m, 100 m" and the POI-destination distance 336 between "Q" and the destination point 224 can be 300 m. In addition, the proximity threshold distance 330 can be 600 m. Based on the distance of 600 m representing the proximity threshold distance 330 exceeding the POI-destination distance 336 of 300 m between Q and the destination point 224, the provisional module 630 can determine the POI 230 denoted Q as the proximity POI 326.

The provisional module 630 is not limited to determining the provisional POI 320 representing the destination POI 322, the route POI 324, the proximity POI 326, or a combination thereof based on a single instance of the destination point 224, the provisional route 318, the proximity threshold distance 330, the pass-through threshold distance 332, the distance limitation threshold 306, or a combination thereof. For example, the provisional module 630 can factor other combination of the destination point 224, the provisional route 318, the proximity threshold distance 330, the pass-through threshold distance 332, the distance limitation threshold 306, the geographic limitation 302, or a combination thereof previously used for determining the provisional POI 320 to determine another instance of the provisional POI 320.

For a specific example, the provisional module 630 can determine the route POI 324 based on the distance limitation threshold 306, the provisional route 318, or a combination thereof. In this specific example, the provisional module 630 can limit the search of the POI 230 to the POI 230 located within the pass-through threshold distance 332 from the provisional route 318, the POI 230 located within the distance limitation threshold 306 from the start point 222, or a combination thereof for determining the route POI 324. In a different specific example, the provisional module 630 can limit the search of the proximity POI 326 to the POI 230 located within the destination limitation threshold 306 from the start point 222.

It has been discovered that the navigation system 100 determining the provisional POI 320 based on multiple instance of the geographic limitation 302, the provisional route 318, the destination point 224, or a combination thereof improves the functionality of the navigation system 100. For example, limiting the search of the POI 230 to the POI 230 located within the pass-through threshold distance 332 from the provisional route 318 and also within the distance limitation threshold 306 from the start point 222, the navigation system 100 can reduce an unnecessary operation of searching the POI 230 located outside the permitted transportation distance of the user. By eliminating the unnecessary operation of searching the POI 230 located outside the distance limitation threshold 306, the navigation system 100 can reduce the overall process imposed on the first device 102. By reducing the overall process imposed on the first device 102, the navigation system 100 can allocate the saved processing power to other function, reduce the energy consumption to extend the operation life of the navigation system 100, reduce the processing time required to generate the result, or a combination thereof.

It has also been discovered that the navigation system 100 determining the provisional POI 320 based on multiple instance of the geographic limitation 302, the provisional route 318, the destination point 224, or a combination thereof improves the speed of operating the navigation system 100. For example, by reducing the processing time required to determine the provisional POI 320, the user can receive the confirmation or rejection for his transportation request 220 in a reduced time. As a result, the user can promptly decide to provide a different instance of the destination information 210 or search for an alternate mode of transportation to reach the destination point 224. The provisional module 630 can communicate the provisional information 316 including the provisional route 318, the provisional POI 320, or a combination thereof to a compare module 640.

The navigation system 100 can include the compare module 640, which can couple to the provisional module 630. The compare module 640 determines the navigation restriction 402. The compare module 640 can determine the navigation restriction 402 of FIG. 4 in various ways.

For example, the compare module 640 can determine the navigation restriction 402 including the destination restriction 404 of FIG. 4 based on the route distance 328, the distance limitation threshold 306, or a combination thereof. In this example, the compare module 640 can compare the route distance 328, the distance limitation threshold 306, or a combination thereof to determine the destination restriction 404 based on the route distance 328 exceeding the distance limitation threshold 306.

For a specific example, the route distance 328 can be 50 miles, the distance limitation threshold 306 can be 40 miles, or a combination thereof. In this specific example, the compare module 640 can compare the route distance 328 of 50 miles and the distance limitation threshold 306 of 40 miles. Continuing in this specific example, the compare module 640 can determine "Distance Exceed" representing the destination restriction 404 based on the route distance 328 of 50 miles exceeding the distance limitation threshold 306 of 40 miles.

In another example, the compare module 640 can determine the navigation restriction 402 including the destination restriction 404 of FIG. 4 based on the prohibited destination access 310, the POI restriction 412 associated with the destination POI 322, or a combination thereof. For example, the compare module 640 can search the rule information 410 representing the POI restriction information 418 to determine the POI restriction 412 associated with the destination POI 322. Continuing in this example, the compare module 640 can compare the POI restriction 412, the prohibited destination access 310, or a combination thereof. Based on the match, the compare module 640 can determine the destination restriction 404.

For a specific example, the traveler attribute 208 representing the traveler age can be "20," the destination POI 322 can be a "Bar," or a combination thereof. In this specific example, the prohibited destination access 310 can be "Age requirement 21 and over" based on the traveler age of "20." Continuing in this specific example, the compare module 640 can search the POI restriction information 418 to determine the POI restriction 412 of "Age requirement 21 and over" based on the destination POI 322 of "Bar" associated with the POI restriction 412 of "Age requirement 21 and over." The compare module 640 can compare the prohibited destination access 310 of "Age requirement 21 and over," the POI restriction 412 of "Age requirement 21 and over," or a combination thereof. Based on the match, the compare module 640 can determine "Unpermitted Destination—Age requirement not met" representing the destination restriction 404.

The compare module 640 is not restricted to determining the navigation restriction 402 representing the destination restriction 404 based on the traveler attribute 208 representing the traveler age. For example, the compare module 640 can also determine the destination restriction 404 based on the prohibited destination access 310 determined from other instances of the traveler information 204. For example, the compare module 640 can determine the destination restriction 404 based on the prohibited destination access 310 determined based on the traveler identification 206. In a different example, the compare module 640 can determine the destination restriction 404 based on the prohibited destination access 310 determined based on the traveler attribute 208 including the traveler condition, legal status, or a combination thereof.

The compare module 640 can determine the navigation restriction 402 including the proximity restriction 406 of FIG. 4. For example, the compare module 640 can determine the POI restriction 412 based on searching the rule information 410 for the POI restriction 412 associated with the proximity POI 326. Continuing in this example, the compare module 640 can determine the proximity restriction 406 based on comparing the prohibited proximity access 312, the POI restriction 412 of the proximity POI 326, or a combination thereof for a match.

For a specific example, the prohibited proximity access 312 can represent "Sex Offender" based on the traveler attribute 208 representing the legal status of "Past sex crime convict" and the proximity POI 326 representing "Day Care" as denoted as "Q" of FIG. 2. Continuing in this specific example, the compare module 640 can search the traveler restriction information 416 to retrieve the POI restriction 412 of "Sex Offender" associated with the proximity POI 326 of "Day Care." Continuing in this specific example, the compare module 640 can compare "Sex Offender" representing the POI restriction 412, "Sex Offender" representing the prohibited proximity access 312, or a combination thereof. Based on the match, the compare module 640 can determine "Sex Offender—Legal Status not met" representing the proximity restriction 406.

In a further example, the compare module 640 can determine the pass-through restriction 408 of FIG. 4. The compare module 640 can determine the pass-through restriction 408 based on the prohibited pass-through access 314, the POI restriction 412 associated with the route POI 324, or a combination thereof. For example, the compare module 640 can determine the POI restriction 412 based on retrieving the POI restriction 412 associated to the route POI 324 from the POI restriction information 418. Continuing in this example, the compare module 640 can compare the POI restriction 412 of the route POI 324, the prohibited pass-through access 314, or a combination thereof for a match to determine the pass-through restriction 408.

For a specific example, the prohibited pass-through access 314 can be a "Child Facility." In this specific example, the "Day Care" denoted C of FIG. 3 can be the route POI 324 based on the "Day Care" located within the pass-through threshold distance 332 from the provisional route 318. Continuing in this specific example, the compare module 640 can search the POI restriction information 418 to retrieve the "Child Facility" representing the POI restriction 412 based on the "Day Care" representing the route POI 324 associated with the "Child Facility." In this specific example, the compare module 640 can compare the POI restriction 412 of "Child Facility," the prohibited pass-through access 314 of "Child Facility," or a combination thereof. Based on the match, the compare module 640 can determine the "Sex Offender—Legal Status not met" representing the pass-through restriction 408. The compare module 640 can communicate the navigation restriction 402 to an override module 650.

The navigation system 100 can include the override module 650, which can couple to the compare module 640. The override module 650 determines the restriction override 414 of FIG. 4. The override module 650 can determine the restriction override 414 based on retrieving the restriction override 414 from a permission grantor. More specifically, the override module 650 can determine the restriction override 414 based on retrieving the restriction override 414 from the permission grantor through the first user interface 518, from the rule information 414 in the second device 106 through the first communication unit 516, from the rule information 414 in the first storage unit 514, or a combination thereof.

For a specific example, a registered sex offender can provide the destination information 210 to travel to the destination point 224 representing his home residence. In this specific example, the override module 650 can further retrieve the restriction override 414 from the permission grantor. For example, the override module 650 can retrieve "Permission to travel regardless of Child Facility within 500 ft of the destination if the destination is the registered sex offender's residence or workplace" representing the restriction override 414. Based on retrieving the restriction override 414, the override module 650 can determine the "Permission to travel regardless of Child Facility within 500 ft of the destination if the destination is the registered sex offender's residence or workplace" as the restriction override 414.

The override module 650 can further determine the permitted destination 424 of FIG. 4 in a different way. For example, the override module 650 can search the rule information 410 representing the override information 420 for the permitted destination 424 associated with the restriction override 414. For a specific example, the "Child Facility Restriction, Sex Offender Home Residence Exception" can represent the restriction override 414. In this specific example, the override module 650 can search the override information 420 for the permitted destination 424 associated with the restriction override 414. Continuing in this specific example, the override module 650 can determine the "Sex Offender—Legal Status not met" as the permitted destination 424 based on the "Sex Offender—Legal Status not met" associated to the restriction override 414 of "Child Facility Restriction, Sex Offender Home Residence Exception."

It has been discovered that the distributed architecture of the navigation system 100 determining the permitted destination 424 based on searching the rule information 410 retrieved from the second device 106 through the first communication unit 516 improves the functionality of the navigation system 100. For example, by retrieving the rule information 410 from the second device 106, the navigation system 100 can increase the available amount of the rule information 410 without increasing the storage size of the first storage unit 514. By increasing the available amount of the rule information 410 without increasing the storage size of the first storage unit 514, the navigation system 100 can reduce the storage space required for storing the rule information 410 in the first device 102. By reducing the storage space required for storing the rule information 410 in the first device 102, the navigation system 100 can allocate the saved storage space to other functions and information. This memory distribution feature of the distributed architecture is an advantage over the previous navigation system 100 since the storage size in the first storage unit 514 can be fixed and thereby limiting the amount of the rule information 410 available for the navigation system 100 to use.

In a different example, by retrieving the rule information 410 from the second device 106, the navigation system 100 can access the updated instance of the rule information 410. For example, the rule information 410 stored in the second device 106 can be updated reflecting changes in the real world manually by the operator of the second device 106, automatically based on the information available to the second device 106, or a combination thereof. Continuing in this example, contrary to the rule information 410 stored in the second device 106, the rule information 410 stored in the first device 102 cannot reflect the update without the user of the first device 102 manually input the change, a pre-determined triggering event updating the rule information 410 is determined by the first device 102, or a combination thereof. Using the current invention, the first device 102 retrieving the rule information 410 from the second device 106 can provide the updated instance of the rule information 410 to the first device 102 based on the first device 102 communicating with the second device 106. The distributed architecture of the navigation system 100 can permit the user of the first device 102 to operate the navigation system 100 with the updated instance of the rule information 410 without the need to manually update the changes, the pre-determined triggering event is determined by the first device 102, or a combination thereof. As a result, the user can seamlessly operate the navigation system without the need to manually update the rule information 410 and rely on the most current updated instance of the rule information 410 reflecting the changes occurring in the real world. The override module 650 can communicate the restriction override 414, the permitted destination 424, or a combination thereof to a permission module 660.

The navigation system 100 can include the permission module 660, which can couple to the override module 650. The permission module 660 generates the navigation permission 422 of FIG. 4. For example, the permission module 660 can generate the navigation permission 422 based on the restriction override 414, the absence of the navigation restriction 402, or a combination thereof.

For a specific example, the permission module 660 can determine the navigation permission 422 based on the absence of the navigation restriction 402. In this specific example, the permission module 660 can search the navigation system 100 for the navigation restriction 402. Based on determining the absence of the navigation restriction 402, the permission module 660 can determine the navigation permission 422.

For a different example, the permission module 660 can generate the navigation permission 422 based on the presence of the navigation restriction 402, the restriction override 414 nullifying the navigation restriction 402, or a combination thereof. In this example, the permission module 660 can search the rule information 410 representing the override information 420 for the permitted destination 424 associated with the restriction override 414. Continuing in this example, the permission module 660 can compare the navigation restriction 402, the permitted destination 424, or a combination thereof. Based on determining the match, the permission module 660 can nullify the navigation restriction 402 to generate the navigation permission 422.

For a specific example, the "Sex Offender—Legal Status not met" can represent the navigation restriction 402 and the "Child Facility Restriction, Sex Offender Home Residence Exception" can represent the restriction override 414. In this specific example, the permission module 660 can search the rule information 410 for the permitted destination 424 associated with the "Child Facility Restriction, Sex Offender Home Residence Exception" representing the restriction override 414. Continuing in this example, the permission module 660 can determine the "Child Facility Restriction, Sex Offender Home Residence Exception" representing the restriction override 414 associated with the "Sex Offender—Legal Status not met" representing the permitted destination 424. The permission module 660 can compare the "Sex Offender—Legal Status not met" representing the navigation restriction 402 and the "Sex Offender—Legal Status not met" representing the permitted destination 424 for a match. Based on determining the match, the permission module 660 can generate the navigation permission 422.

For a different specific example, the "Sex Offender—Legal Status not met" can represent the navigation restriction 402 and the "Travel to Pharmacy, Workplace Exception" can represent the restriction override 414. In this specific example, the permission module 660 can search the rule information 410 for the "Travel to Pharmacy, Workplace Exception" representing the restriction override 414. Continuing in this example, the permission module 660 can determine the "Travel to Pharmacy, Workplace Exception" representing the restriction override 414 associated with the "Drug Providing Facility—Legal Status not met" representing the permitted destination 424. Based on comparing and failing to determining the match between the "Sex Offender—Legal Status not met" representing the navigation restriction 402 and the "Drug Providing Facility—Legal Status not met" representing the permitted destination 424, the permission module 660 will not generate the navigation permission 422.

For another specific example, the "Sex Offender—Legal Status not met" can represent the navigation restriction 402 and the permission module 660 can fail to determine the restriction override 414. Based on the navigation restriction 402 and the absence of the restriction override 414, the permission module 660 will not generate the navigation permission 422.

The physical transformation from a movement of the first device 102 such as the movement by a person carrying the first device 102, the vehicle equipped with the first device 102, or a combination thereof results in the movement in the physical world based on the operation of the navigation system 100. As the movement in the physical world occurs, the movement itself creates additional information that is converted back into generating the request information 202 including the start point 222, the destination point 224, the provisional information 316 including the provisional route 318, the provisional POI 320 including the route POI 324, or a combination thereof in dynamic and real-time from a multiple instances of the second device 106 for the continued operation of the navigation system 100 and to continue the movement in the physical world.

The first software 526 of FIG. 5 of the first device 102 of FIG. 5 can include the modules for the navigation system 100. For example, the first software 526 can include the request module 610, the restriction module 620, the provisional module 630, the compare module 640, the override module 650 and the permission module 660.

The first control unit 512 of FIG. 5 can execute the first software 526 for the request module 610 to determines the request information 202. The first control unit 512 can also execute the first software 526 for the restriction module 620 to determine the information priority 218. The first control 512 can also execute the first software 526 for the restriction module 620 to determine the rule information 410. The first control unit 512 can execute the first software 526 for the request module 610 to determine the start point 222, the destination point 224, and the transportation request 220. The first control unit 512 can execute the first software 526 for the restriction module 620 to determine the geographic limitation 302. The first control unit 512 can execute the first software 526 for the provisional module 630 to generate the provisional route 318 and to determine the provisional POI 320. The first control unit 512 can execute the first software 526 for the compare module 640 to generate the navigation restriction 402. The first control unit 512 can execute the first software 526 for the override module 650 to determine the restriction override 414. The first control unit 512 can execute the first software 526 for the override module 650 to determine the permitted destination 424. The first control unit 512 can execute the first software 526 for the permission module 660 to generate the navigation permission 422.

The second software 542 of FIG. 5 of the second device 106 of FIG. 5 can include the modules for the navigation system 100. For example, the second software 542 can include the request module 610, the restriction module 620, the provisional module 630, the compare module 640, the override module 650 and the permission module 660.

The second control unit 534 of FIG. 5 can execute the second software 542 for the request module 610 to determine the request information 202. The second control unit 534 can also execute the second software 542 for the restriction module 620 to determine the information priority 218. The second control unit 534 can also execute the second software 542 for the restriction module 620 to determine the rule information 410. The second control unit 534 can execute the second software 542 for the request module 610 to determine the start point 222, the destination point 224, and the transportation request 220. The second control unit 534 can execute the second software 542 for the restriction module 620 to determine the geographic limitation 302. The second control unit 534 can execute the second software 542 for the provisional module 630 to generate the provisional route 318 and determine the provisional POI 320. The second control unit 534 can execute the second software 542 for the compare module 640 to generate the navigation restriction 402. The second control unit 534 can execute the second software 542 for the override module 650 to determine the restriction override 414. The second control unit 534 can execute the second software 542 for the override module 650 to determine the permitted destination 424. The second control unit 534 can execute the second software 542 for the permission module 660 to generate the navigation permission 422.

The modules of the navigation system 100 can be partitioned between the first software 526 and the second software 542. The second software 542 can include the restriction module 620, the provisional module 630, the compare module 640, the override module 650, and the permission module 660. The second control unit 534 can execute modules partitioned on the second software 542 as previously described.

The first software 526 can include the request module 610. Based on the size of the first storage unit 514, the first software 526 can include additional modules of the navigation system 100. The first control unit 512 can execute the modules partitioned on the first software 526 as previously described.

The first control unit 512 can operate the first communication interface 528 of FIG. 5 to communicate the request information 202, the geographic limitation 302, the provisional information 316, the navigation restriction 402, the rule information 410, the navigation permission 422, or a combination thereof to or from the second device 106 through the communication path 104 of FIG. 5. The first control unit 512 can operate the first software 526 to operate the location unit 520.

The second control unit 534 can operate the second communication interface 550 of FIG. 5 to communicate the request information 202, the geographic limitation 302, the provisional information 316, the navigation restriction 402, the rule information 410, the navigation permission 422, or a combination thereof to or from the first device 102 through the communication path 104 of FIG. 5.

The first control unit 512 can operate the first user interface 518, the second user interface 538 of FIG. 5, or a combination thereof to display the request information 202, the geographic limitation 302, the provisional information 316, the navigation restriction 404, the rule information 410, the navigation permission 422, a geographic region, or a combination thereof. More specifically, the first user interface 518, the second user interface 538, or a combination thereof can display the digital representation of the provisional route 318, the provisional POI 320, the start point 222, the destination point 224, or a combination thereof to represent the physical world.

The navigation system 100 describes the module functions or order as an example. The modules can be partitioned differently. For example, the request module 610 and the provisional module 620 can be combined. Each of the modules can operate individually and independently of the other modules. Furthermore, data generated in one module can be used by another module without being directly coupled to each other. For example, the request module 610 can receive the rule information 410 from the override module 650. Further, "communicating" can represent sending, receiving, transmitting, or a combination thereof the data generated to or from one to another.

The modules described in this application can be hardware implementation or hardware accelerators in the first control unit 512 or in the second control unit 534. The modules can also be hardware implementation or hardware accelerators within the first device 102 or the second device 106 but outside of the first control unit 512 or the second control unit 534, respectively as depicted in FIG. 5. However, it is understood that the first control unit 512, the second control unit 534, or a combination thereof can collectively refer to all hardware accelerators for the modules.

The modules described in this application can be implemented as instructions stored on a non-transitory computer readable medium to be executed by the first control unit 512, the second control unit 534, or a combination thereof. The non-transitory computer medium can include the first storage unit 514 of FIG. 5, the second storage unit 546 of FIG. 5, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 7:
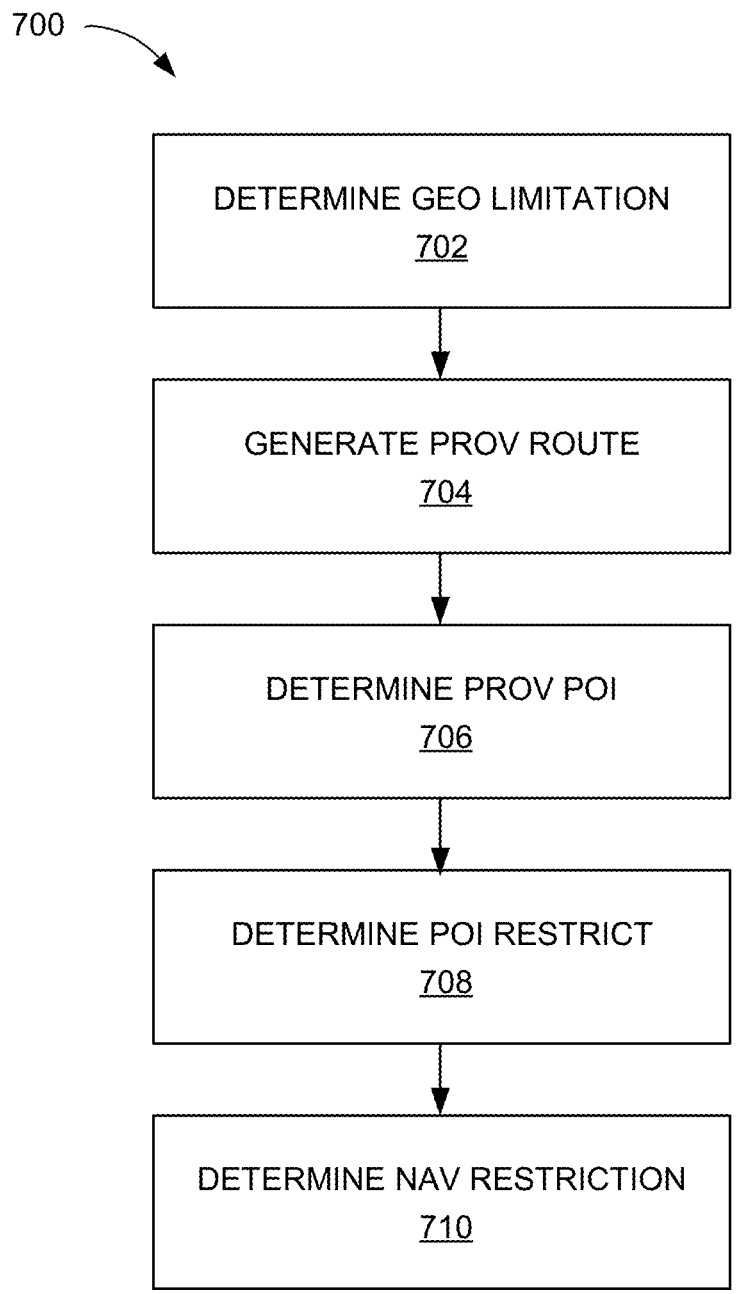
FIG. 7 is a flow chart of a method of operation of the navigation system in a further embodiment of the present invention.

Referring now to FIG. 7, therein is shown a flow chart of a method 700 of operation of the navigation system 100 in a further embodiment of the present invention. The method 700 includes: determining a geographic limitation with a control unit based on the geographic limitation associated with a traveler information included in a traveler restriction information in a block 702; generating a provisional route based on a path between a start point and a destination point in a block 704; determining a provisional POI based on a POI of the provisional route in a block 706; determining a POI restriction based on the POI restriction associated with the provisional POI included in a rule information in a block 708; determining a navigation restriction based on matching the geographic limitation and the POI restriction for presenting on a device in a block 710.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   determining a geographic limitation with a control unit based on the geographic limitation associated with a traveler information included in a traveler restriction information;
   generating a provisional route based on a path between a start point and a destination point;
   determining a provisional point of interest based on a point of interest of the provisional route;
   determining a point of interest restriction based on the point of interest restriction associated with the provisional point of interest included in a rule information;
   determining a navigation restriction based on matching the geographic limitation and the point of interest restriction for presenting on a device; and
   wherein determining the geographic limitation includes determining a prohibited proximity access based on the prohibited proximity access associated with the traveler information included in the traveler restriction information.

2. The method as claimed in claim 1 further comprising:
   determining a permitted destination based on the permitted destination associated with a restriction override included in the rule information; and
   generating a navigation permission based on matching the navigation restriction and the permitted destination.

3. The method as claimed in claim 1 wherein determining the geographic limitation includes:
   determining a route distance based on a physical location of the start point and the destination point of the provisional route; and
   determining the geographic limitation representing a prohibited destination access based on a distance limitation threshold meeting or exceeding the route distance.

4. The method as claimed in claim 1 wherein determining the geographic limitation includes determining a prohibited destination access based on the prohibited destination access associated with the traveler information included in the traveler restriction information.

5. The method as claimed in claim 1 wherein determining the geographic limitation includes determining a prohibited pass-through based on the prohibited pass-through associated with the traveler information included in the traveler restriction information.

6. The method as claimed in claim 1 wherein determining the provisional point of interest includes determining a destination point of interest based on matching a physical location of the point of interest and the destination point.

7. The method as claimed in claim 1 wherein determining the provisional point of interest includes determining a route point of interest based on locating the point of interest within a pass-through threshold distance of the provisional route.

8. The method as claimed in claim 1 wherein determining the provisional point of interest includes determining a proximity point of interest based on locating the point of interest within a proximity threshold distance from the destination point.

9. The method as claimed in claim 1 wherein determining the geographic limitation includes determining the geographic limitation based on the geographic limitation associated with a traveler attribute included in the traveler restriction information.

10. A navigation system comprising:
    a control unit for:
    determining a geographic limitation based on the geographic limitation associated with a traveler information included in a traveler restriction information, wherein determining the geographic limitation includes determining a prohibited proximity access based on the prohibited proximity access associated with the traveler information included in the traveler restriction information,
    generating a provisional route based on a path between a start point and a destination point,
    determining a provisional point of interest based on a point of interest of the provisional route,
    determining a point of interest restriction based on the point of interest restriction associated with the provisional point of interest included in a rule information,
    determining a navigation restriction based on matching the geographic limitation and the point of interest restriction, and
    a communication interface, coupled to the control unit, for communicating the navigation restriction for presenting on a device.

11. The system as claimed in claim 10 wherein the control unit is for generating a navigation permission includes:
    determining a permitted destination based on the permitted destination associated with a restriction override included in the rule information, and
    generating the navigation permission based on matching the navigation restriction and the permitted destination.

12. The system as claimed in claim 10 wherein the control unit is for determining the geographic limitation includes:
    determining a route distance based on a physical location of the start point and the destination point of the provisional route, and
    determining the geographic limitation representing a prohibited destination access based on a distance limitation threshold meeting or exceeding the route distance.

13. The system as claimed in claim 10 wherein the control unit is for determining the geographic limitation includes determining a prohibited destination access based on the prohibited destination access associated with the traveler information included in the traveler restriction information.

14. A non-transitory computer readable medium including instructions for execution, the instructions comprising:
    determining a geographic limitation based on the geographic limitation associated with a traveler information included in a traveler restriction information;
    generating a provisional route based on a path between a start point and a destination point;
    determining a provisional point of interest based on a point of interest of the provisional route;
    determining a point of interest restriction based on the point of interest restriction associated with the provisional point of interest included in a rule information;
    determining a navigation restriction based on matching the geographic limitation and the point of interest restriction for presenting on a device; and
    wherein determining the geographic limitation includes determining a prohibited proximity access based on the prohibited proximity access associated with the traveler information included in the traveler restriction information.

15. The non-transitory computer readable medium as claimed in claim 14 further comprising generating a navigation permission includes:
   determining a permitted destination based on the permitted destination associated with a restriction override included in the rule information; and
   generating a navigation permission based on matching the navigation restriction and the permitted destination.

16. The non-transitory computer readable medium as claimed in claim 14 wherein determining the geographic limitation includes:
   determining a route distance based on a physical location of the start point and the destination point of the provisional route; and
   determining the geographic limitation representing a prohibited destination access based on a distance limitation threshold meeting or exceeding the route distance.

17. The non-transitory computer readable medium as claimed in claim 14 wherein determining the geographic limitation includes determining a prohibited destination access based on the prohibited destination access associated with the traveler information included in the traveler restriction information.

* * * * *